US008828197B2

(12) United States Patent
Ryan et al.

(10) Patent No.: US 8,828,197 B2
(45) Date of Patent: Sep. 9, 2014

(54) HOLDER JIG FOR ELECTROSTATIC PAINTING

(75) Inventors: James P. Ryan, Powell, OH (US); Todd A. Fitz, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1431 days.

(21) Appl. No.: 11/834,079

(22) Filed: Aug. 6, 2007

(65) Prior Publication Data

US 2009/0039232 A1 Feb. 12, 2009

(51) Int. Cl.
*B23H 7/26* (2006.01)
*B05B 13/02* (2006.01)

(52) U.S. Cl.
CPC .................................... *B05B 13/02* (2013.01)
USPC ........ 204/297.01; 118/500; 118/71; 29/281.1

(58) Field of Classification Search
USPC ............ 248/304, 305, 306, 307, 200, 222.12, 248/139, 558, 149; 118/630, 500, 71, 503; 204/297.09, 247.16, 297.06, 297.01; 280/834; 180/69.4; 29/281.1; 269/71, 269/73, 24, 27, 32
See application file for complete search history.

(56) References Cited

U.S. PATENT DOCUMENTS 158,972 A * 1/1875 Osborn .................... 204/297.06
2,730,988 A 1/1956 Starkey
2,877,740 A 3/1959 Friderici
3,000,806 A * 9/1961 Marotta et al. ........... 204/297.11
3,607,707 A * 9/1971 Chenevier .................. 204/297.1
4,097,359 A * 6/1978 Davitz ..................... 204/297.06
4,421,627 A 12/1983 LeBaron
4,450,954 A 5/1984 O'Connell
4,628,859 A * 12/1986 Hines ............................ 118/630
4,703,716 A 11/1987 Hatfield
4,872,963 A * 10/1989 Van Horn ................. 204/297.09
5,081,952 A 1/1992 Grassi et al.
5,553,823 A * 9/1996 Protz, Jr. ....................... 248/304
5,607,230 A * 3/1997 Protz, Jr. ....................... 362/396
5,653,805 A * 8/1997 Russell et al. ................ 118/503
5,753,042 A 5/1998 Bauer
5,897,709 A 4/1999 Torefors
5,908,120 A * 6/1999 Yates et al. .................... 211/119
6,273,279 B1 * 8/2001 Wolf .......................... 211/86.01
6,325,899 B1 12/2001 DeWent
6,398,871 B1 6/2002 Hur
6,464,787 B2 10/2002 DeWent
6,530,489 B1 * 3/2003 Van Horn et al. ............. 211/113
6,579,369 B2 6/2003 DeWent (Continued)

FOREIGN PATENT DOCUMENTS

DE 36 31 747 3/1988
EP 1806182 A1 * 7/2007 ................ B05B 5/08

(Continued)

*Primary Examiner* — Kimberly Wood
(74) *Attorney, Agent, or Firm* — Capitol City TechLaw, PLLC; Mark E. Duell

(57) ABSTRACT

A jig for connecting a part to a body for an on-line painting process may include a plastic adaptor and a metal hanger. The plastic adaptor may be configured to be connected to a part to be painted, and the metal hanger may be removably connectable to the plastic adaptor. The metal hanger may be configured to be connected to a body to be painted.

19 Claims, 3 Drawing Sheets

(56) References Cited

U.S. PATENT DOCUMENTS

| | | | | |
|---|---|---|---|---|
| 6,607,600 | B2 | 8/2003 | DeWent | |
| 6,726,772 | B2 | 4/2004 | Owed, Jr. | |
| 6,945,501 | B2 * | 9/2005 | Thompson | 248/58 |
| 7,021,476 | B2 * | 4/2006 | Lloyd et al. | 211/113 |
| 7,036,203 | B2 * | 5/2006 | Rudduck | 29/469 |
| 2007/0160771 | A1 * | 7/2007 | Sarajian | 427/458 |

FOREIGN PATENT DOCUMENTS

| | | | | | |
|---|---|---|---|---|---|
| JP | 61-120661 | | | 6/1986 | |
| JP | 61120661 | A | * | 6/1986 | B05D 1/04 |
| JP | 61227870 | A | * | 10/1986 | B05D 1/04 |
| JP | 7051602 | | | 2/1995 | |
| JP | 11-138058 | | | 5/1999 | |
| JP | 2001-121047 | | | 5/2001 | |

* cited by examiner

HOLDER JIG FOR ELECTROSTATIC PAINTING

BACKGROUND

1. Field

The disclosed subject matter relates to automobile body-in-white painting. More particularly, the disclosed subject matter relates to jigs for connecting a part to be painted with a body to be painted in an on-line process for automobile body-in-white painting.

2. Brief Description of the Related Art

Automobile manufacturers conventionally perform automobile body-in-white painting in an on-line process. Such an on-line process typically includes an electrodeposition coating ("E-coat") via a dip or bath, E-coat curing, primer application, primer curing, a base/clear coat application, and/or top coat curing. The bodies and/or parts painted via this process require an ability to withstand extremely high heat conditions, for example, approximately 200° C. In addition, some conventional processes include an electrostatic paint process for certain parts such as, for example, fuel filler doors, requiring conductivity and electrical grounding of these parts.

Recent technologies have enabled some plastic parts to pass through the same on-line and electrostatic paint processes as conventional bodies-in-white. Such plastic parts are often attached to the body-in-white using an all plastic jigging fixture. The use of all plastic minimizes concerns related to differing thermal expansion rates between varying materials, for example, steel and plastic. However, the use of all plastic jigging fixtures introduces a large amount of scrap and waste into the process because such plastic jigging fixtures are generally not reusable and must be discarded after one use. By contrast, a metal jig can be continuously recycled, with excess paint build-up being removed from time to time.

Since plastic and metal parts have dissimilar rates of thermal expansion and contraction, when both plastic and metal are exposed to the same temperature conditions, the plastic part will generally expand and contract (when heated and cooled, respectively) at a significantly higher rate than the metal component. If the plastic and metal parts are joined together, as in the case of a jigging fixture for on-line painting, these expansion and contraction variances can induce high stresses in the parts and possibly lead to part deformation and/or cracking.

It may be desirable to provide a jig, or connector, for connecting a part to a body-in-white for an on-line painting process, where the jig is partly plastic and partly steel. It may be desirable that such a "hybrid" plastic and steel jig minimize the effect of expansion and contraction variations between the two materials. It may be desirable for the jig to provide an electrical ground of the part during an electrostatic coating process.

SUMMARY

According to some aspects of the disclosed subject matter, a jig for connecting a part to a body for an on-line painting process may include a plastic adaptor and a metal hanger. The plastic adaptor may be configured to be connected to a part to be painted, and the metal hanger may be removably connectable to the plastic adaptor. The metal hanger may be configured to be connected to a body to be painted.

In accordance with various aspects of the disclosed subject matter, a method for connecting a part to a body for an on-line painting process may comprise connecting a plastic adaptor to a part to be painted, removably connecting a metal hanger to the plastic adaptor, and connecting the metal hanger to a body to be painted.

In accordance with some aspects of the disclosed subject matter, a jig for connecting a part to a body for an on-line painting process may comprise a plastic adaptor and a metal hanger. The plastic adaptor may have a first portion configured to be connected to a part to be painted and a second portion extending from the first portion and configured to removably receive the hanger. The metal hanger may have a first portion removably connectable to the plastic adaptor and a second portion configured to be connected to a body to be painted.

Still other objects, features, and attendant advantages of the disclosed subject matter will become apparent to those skilled in the art from a reading of the following detailed description of embodiments constructed in accordance therewith, and taken in conjunction with the accompanying drawings.

BRIEF DESCRIPTION OF THE DRAWINGS

The disclosed subject matter of the present application will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
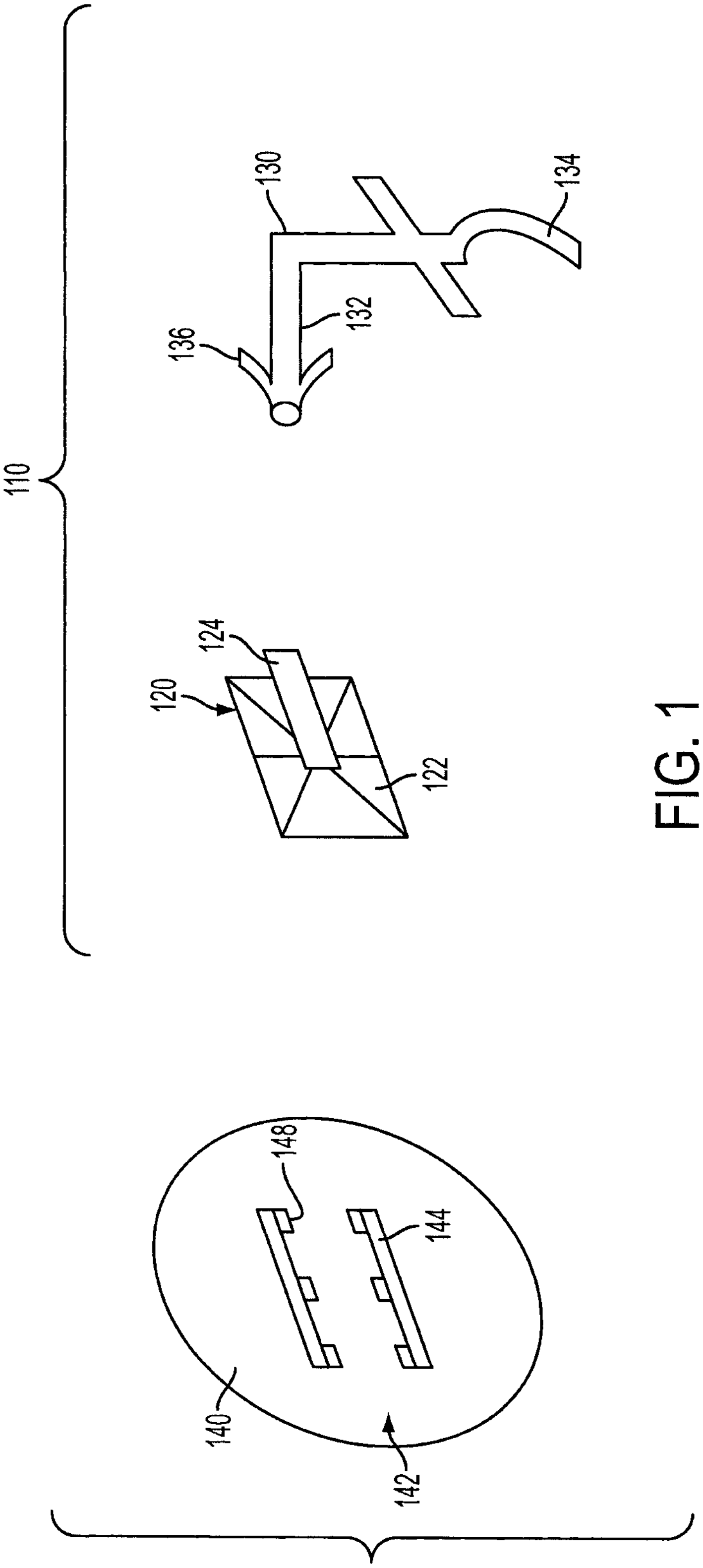
FIG. 1 is an expanded, perspective view of an exemplary jig and an exemplary part to be painted in accordance with principles of the disclosed subject matter.

Referring to the drawing figures, like reference numerals designate identical or corresponding elements throughout the several figures.

FIG. 1 shows a perspective view of an exemplary jig 110 for connecting a part to a body for an on-line painting process, in accordance with the principles of the disclosed subject matter. The jig 110 may include a plastic adaptor 120 and a metal hanger 130. The plastic adaptor 120 may comprise a high heat resistant and electrically conductive plastic, such as, for example, various nylon-based compositions including, for instance, PA/PPO compositions of which Noryl GTX 979 is one preferred composition, or in some cases, various polyester-based compositions, such as, Shin-E Rynite (RE8001). The metal hanger 130 may be constructed of materials such as, for example, steel, steel alloys, stainless steel, aluminum, and aluminum alloys.

Figure 2:
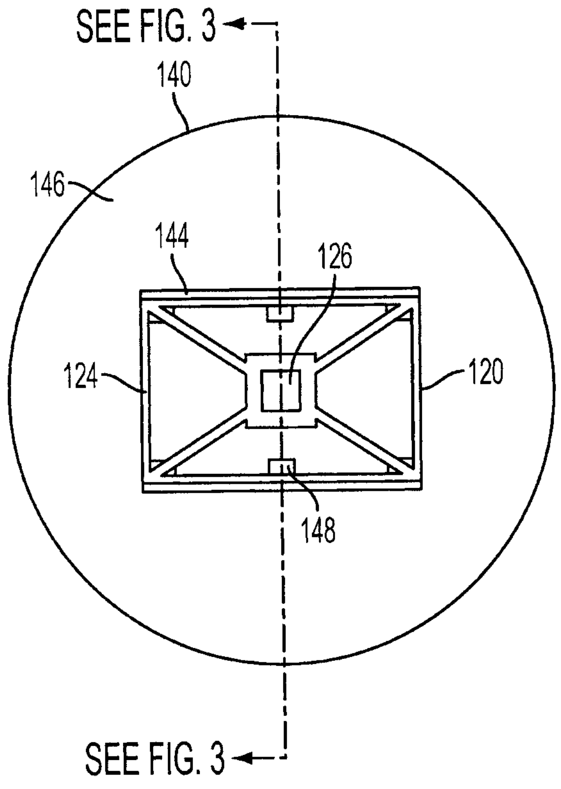
FIG. 2 is a front plan view of the plastic adaptor of the jig of FIG. 1 connected with an exemplary part to be painted in accordance with principles of the disclosed subject matter.

The plastic adaptor 120 may comprise a first portion 122 configured to be coupled with a part to be painted 140 and a second portion 124 extending from the first portion in a direction opposite to the part to be painted 140. As shown in FIG. 2, the second portion 124 of the plastic adaptor 120 may comprise a hollow receptacle 126.

The hanger 130 may comprise a first portion 132 configured to be removably coupled with the second portion 124 of the plastic adaptor 120. The receptacle 126 of the second portion 124 of the plastic adaptor 120 may be sized to receive the first portion 132 of the metal hanger 130. The hanger 130 may also include a second portion 134 extending from the first portion 132. The second portion 134 may be configured to be connected to a body to be painted, such as, for example, an automobile body-in-white (not shown).

The part to be painted 140 may comprise, for example, a fuel filler lid, and may be constructed from substantially the same material as the plastic adaptor 120. As shown in FIG. 1, the part to be painted 140 may include structure 142 for connecting the adaptor 120. The structure 142 may include, for example, a pair of opposed walls 144 extending from a substantially planar surface 146 of the part 140. The walls 144 of the structure 142 may include one or more flanges 148 extending therefrom.

Referring now to FIG. 2, the plastic adaptor 120 may be coupled with the part to be painted 140 by sliding the first portion 122 of the plastic adaptor 120 between the opposed walls 144 and under the flanges 148. It should be appreciated that the structure 142 may comprise any other known structure for coupling the adaptor 120 to the part to be painted 140.

Figure 3:
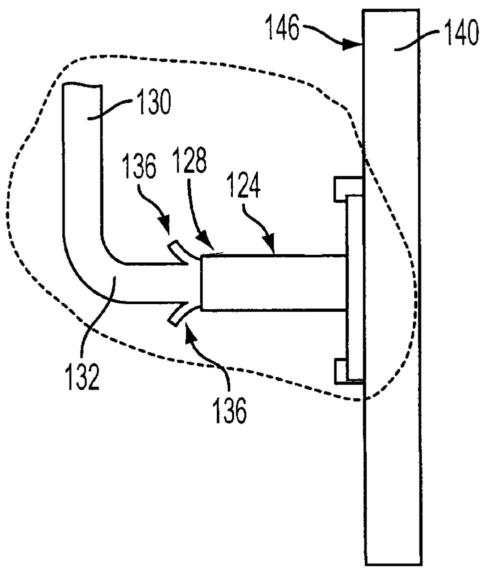
FIG. 3 is a side cross-sectional view of the metal hanger of the jig of FIG. 1 and the connected plastic adaptor and part along line III-III of FIG. 2.

Referring now to FIG. 3, the hanger 130 may include, for example, a pair of bendable fingers 136 biased to extend in opposite directions from the first portion 132 near an end thereof. The fingers 136 may be structured and arranged to bend towards one another as the first portion 132 of the hanger 130 is inserted into the receptacle 126 of the second portion 124 of the adaptor 120.

The second portion 124 of the plastic adaptor 120 may include a pair of openings 128 structured and arranged to substantially align with the bendable fingers 136 when the first portion 132 of the hanger 130 is coupled with the second portion 124 of the adaptor 120. This alignment permits the bendable fingers 136 to return to their oppositely biased orientation and extend through the openings 128, thus providing a "snap-fit" connection between the adaptor 120 and the hanger 130. The fingers 136 may be urged toward one another by a user for insertion into and/or removal from the second portion 124 of the adaptor 120.

In operation, the jig 110 may be used to couple a part to be painted 140, such as, for example, a fuel filler lid, with a body to be painted, such as, for example, an automobile body-in-white. The first portion 122 of the adaptor 120 may be inserted between the opposed walls 144 and between the fingers 148 and surface 146 of the part to be painted 140.

The first portion 132 of the hanger 130 may be inserted into the receptacle 126 of the second portion 124 of the adaptor 120, with the second portion 124 urging the fingers 136 toward one another. Upon reaching alignment with the openings 128 in the second portion 124, the bias of the fingers 136 causes the fingers 136 to extend through the openings 128 for a snap fit connection.

To uncouple the hanger 130 from the adaptor 120, the fingers 136 may be urged toward one another and the hanger 130 pulled away from the second portion 124 of the adaptor 120. It should be appreciated that the order of several steps of the above operation may be changed.

Jigs, or connectors, consistent with the disclosure may minimize concerns regarding the effects of thermal stress at the interface between the adaptor 120 and the part to be painted 140 while reducing the amount of scrap and waste. The jigs may also increase fire safety and paint coverage quality by providing a significant path to electrical ground.

While the disclosed subject matter has been described in detail with reference to exemplary embodiments thereof, it will be apparent to one skilled in the art that various changes can be made, and equivalents employed, without departing from the scope of the disclosed subject matter. Other embodiments of the invention will be apparent to those skilled in the art from consideration of the specification and practice of the disclosed subject matter. It is intended that the specification and examples be considered as exemplary only.

What is claimed is:

1. A jig for an on-line painting process, the jig comprising:

a plastic adaptor having a proximal end portion and a distal end portion, the distal end portion connected to a part to be painted, the plastic adaptor being electrically conductive; and a metal hanger having an end removably connected to the proximal end portion of the plastic adaptor, the metal hanger being configured to be connected to a body to be painted;

wherein a contact interface between the distal end portion of the plastic adaptor and the part to be painted is located beyond the end of the metal hanger.

2. The jig of claim 1, wherein the plastic adaptor is made of the same material as the part to be painted.

3. The jig of claim 1, wherein the part to be painted is a fuel lid.

4. The jig of claim 1, wherein the metal hanger is configured to be connected to an automobile body.

5. The jig of claim 1, wherein the metal hanger includes a pair of bendable prongs received by the proximal end portion of the plastic adaptor in a snap-fit relationship.

6. The jig of claim 5, wherein the prongs are configured to be manipulated to release the plastic adaptor from the snap-fit relationship with the metal hanger.

7. A method for connecting together automobile components for an on-line painting process, the method comprising:

connecting a plastic adaptor to a plastic automobile component to be painted, the plastic adaptor being electrically conductive;

removably connecting a metal hanger to the plastic adaptor; and connecting the metal hanger to a metal automobile component to be painted.

8. The method of claim 7, wherein the plastic adaptor is connected to the plastic automobile component to be painted by coupling a first portion of the plastic adaptor with the plastic automobile component to be painted.

9. The method of claim 8, wherein the metal hanger is removably connected to the plastic adaptor by inserting a first portion of the metal hanger into a second portion of the plastic adaptor extending from the first portion of the plastic adaptor.

10. The method of claim 9, wherein the metal hanger is connected to the metal automobile component to be painted via a second portion of the metal hanger extending from the first portion of the metal hanger.

11. The method of claim 10, wherein the plastic automobile component to be painted is a fuel lid and the metal automobile component to be painted is an automobile body.

12. The method of claim 7, wherein the metal hanger is connected to the plastic adaptor by inserting a pair of bendable prongs into a second portion of the plastic adaptor in a snap-fit relationship.

13. The method of claim 12, further comprising removing the metal hanger from the plastic adaptor by manipulating the prongs to release the plastic adaptor from the snap-fit relationship with the metal hanger.

14. A jig for an on-line painting process, the jig comprising:

a plastic adaptor having first means for connecting to a plastic automobile component to be painted, the plastic adaptor being electrically conductive; and a metal hanger having an end removably connected to the plastic adaptor, and second means for connecting to a metal automobile component to be painted;

wherein the entire first means of the plastic adaptor is located beyond the end of the metal hanger.

15. The jig of claim 14, wherein the plastic adaptor is made of the same material as the plastic automobile component to be painted.

16. The jig of claim 14, wherein the plastic automobile component to be painted is a fuel lid.

17. The jig of claim 14, wherein the metal automobile component to be painted is an automobile body.

18. The jig of claim 14, wherein the metal hanger includes a pair of bendable prongs received by the plastic adaptor in a snap-fit relationship.

19. The jig of claim 18, wherein the prongs are configured to be manipulated to release the plastic adaptor from the snap-fit relationship with the metal hanger.

* * * * *